United States Patent
Bone et al.

[11] Patent Number: 6,076,931
[45] Date of Patent: Jun. 20, 2000

[54] DE-CENTERED LENS GROUP FOR USE IN AN OFF-AXIS PROJECTOR

[75] Inventors: Matthew F. Bone, San Jose; Donald Griffin Koch, Burbank, both of Calif.

[73] Assignee: Aurora Systems, Inc., San Jose, Calif.

[21] Appl. No.: 08/970,887

[22] Filed: Nov. 14, 1997

[51] Int. Cl.⁷ .................................................. G03B 21/14
[52] U.S. Cl. .............................. 353/100; 353/31; 349/5
[58] Field of Search ............................ 353/37, 38, 69, 353/70, 100, 101, 102, 31; 348/746, 745; 349/5, 8, 6

[56] References Cited

U.S. PATENT DOCUMENTS

| | | | |
|---|---|---|---|
| 3,637,308 | 1/1972 | Van Raalte | 353/69 |
| 3,704,936 | 12/1972 | Gorkiewicz | 350/161 |
| 3,790,267 | 2/1974 | Ramberg | 353/44 |
| 3,962,337 | 6/1976 | Lundberg | 353/70 |
| 4,126,386 | 11/1978 | Fritzler | 352/105 |
| 4,183,636 | 1/1980 | Besemnatter | 353/101 |
| 4,376,949 | 3/1983 | Rowe | 348/746 |
| 4,453,178 | 6/1984 | Miyatake | 348/746 |
| 4,875,777 | 10/1989 | Harding | 356/376 |
| 4,999,619 | 3/1991 | Te Velde | 350/333 |
| 5,045,930 | 9/1991 | Hasegawa | 353/101 |
| 5,241,407 | 8/1993 | Sonehara | 350/331 |
| 5,300,942 | 4/1994 | Dolgoff | 353/38 |
| 5,451,103 | 9/1995 | Hatanaka | 353/31 |
| 5,602,679 | 2/1997 | Dolgoff | 359/640 |
| 5,619,381 | 4/1997 | Anderson | 359/677 |
| 5,694,180 | 12/1997 | Deter | 348/746 |
| 5,716,118 | 2/1998 | Sato | 353/98 |
| 5,798,819 | 8/1998 | Hattori | 353/33 |
| 5,826,960 | 10/1998 | Gotoh | 353/20 |

*Primary Examiner*—William Dowling
*Attorney, Agent, or Firm*—Henneman & Saunders; Larry E. Henneman, Jr.

[57] ABSTRACT

A projection system includes a collimating lens group for collimating an imaging beam. The collimating lens group has an optical axis that is de-centered with respect to the axis of the imaging beam. Further, the optical axis of the collimating lens group forms a non-zero angle with the axis of the imaging beam. The de-centered collimating lens group enables the use of more conventional projection optics, without the unacceptable displacement of the projected image.

38 Claims, 17 Drawing Sheets

GENERAL LENS DATA

| | | |
|---|---|---|
| Surfaces | : | 44 |
| Stop | : | 20 |
| System Aperture | : | Float By Stop Size = 20.7165 |
| Ray aiming | : | Paraxial Reference, cache on |
| X Pupil shift | : | 0 |
| Y Pupil shift | : | 0 |
| Z Pupil shift | : | 0 |
| Apodization | : | Uniform, factor = 0.00000E+000 |
| Eff. Focal Len. | : | 58.53495 (in air) |
| Eff. Focal Len. | : | 58.53495 (in image space) |
| Back Focal Len. | : | -1.653826 |
| Total Track | : | 412.8295 |
| Image Space F/# | : | 3.539704 |
| Para. Wrkng F/# | : | 3.538158 |
| Working F/# | : | 3.416875 |
| Obj. Space N.A. | : | 0.001163032 |
| Stop Radius | : | 20.7165 |
| Parax. Ima. Hgt. | : | 18.44587 |
| Parax. Mag. | : | -0.00823628 |
| Entr. Pup. Dia. | : | 16.53668 |
| Entr. Pup. Pos. | : | 98.89065 |
| Exit Pupil Dia. | : | 416.1194 |
| Exit Pupil Pos. | : | -1474.6 |
| Field Type | : | Image height in Millimeters |
| Maximum Field | : | 18.44587 |
| Primary Wave | : | 0.55 |
| Lens Units | : | Millimeters |
| Angular Mag. | : | 0.03974023 |

FIG. 10(a)

Fields          : 6

Field Type: Image height in Millimeters
| # | X-Value | Y-Value | Weight |
|---|---------|---------|--------|
| 1 | 0.000000 | -0.500000 | 1.000000 |
| 2 | 0.000000 | -8.000000 | 1.000000 |
| 3 | 0.000000 | -15.500000 | 1.000000 |
| 4 | -10.000000 | -15.500000 | 1.000000 |
| 5 | -10.000000 | -0.500000 | 1.000000 |
| 6 | -10.000000 | -8.000000 | 1.000000 |

Vignetting Factors
| # | VDX | VDY | VCX | VCY |
|---|-----|-----|-----|-----|
| 1 | 0.000000 | 0.000000 | 0.000000 | 0.000000 |
| 2 | 0.000000 | 0.000000 | 0.000000 | 0.000000 |
| 3 | 0.000000 | 0.000000 | 0.000000 | 0.000000 |
| 4 | 0.000000 | 0.000000 | 0.000000 | 0.000000 |
| 5 | 0.000000 | 0.000000 | 0.000000 | 0.000000 |
| 6 | 0.000000 | 0.000000 | 0.000000 | 0.000000 |

Wavelengths  :  1
Units: Microns
| # | Value | Weight |
|---|-------|--------|
| 1 | 0.550000 | 1.000000 |

FIG. 10(b)

SURFACE DATA SUMMARY:

| Surf | Type | Comment | Raidus | Thickness | Glass | Diameter | Conic |
|---|---|---|---|---|---|---|---|
| OBJ | STANDARD | | Infinity | 7010.4 | | 4481.197 | 0 |
| 1 | COORDBRK | ROTATE | - | 0 | - | - | - |
| 2 | STANDARD | ELEMENT 1 | 891.904 | 8.4416 | S-BSL7 | 88.629 | 0 |
| 3 | STANDARD | | -314.841 | 1.5 | | 86.231 | 0 |
| 4 | STANDARD | ELEMENT 2 | 327.368 | 6 | S-BAH28 | 78.684 | 0 |
| 5 | STANDARD | | 58.979 | 8.1894 | | 68.43 | 0 |
| 6 | STANDARD | ELEMENT 3 | 80.649 | 7.5797 | SF6 | 61.783 | 0 |
| 7 | STANDARD | | 153.819 | 41.2782 | | 59.63 | 0 |
| 8 | STANDARD | ELEMENT 4 | -502.423 | 6 | S-LAL8 | 52.107 | 0 |
| 9 | STANDARD | | 62.248 | 4.5653 | | 48.848 | 0 |
| 10 | STANDARD | ELEMENT 5 | 56.726 | 8.6561 | LF5 | 49.519 | 0 |
| 11 | STANDARD | ZOOM THICKNESS | 206.23 | 20.2006 | | 48.32 | 0 |
| 12 | STANDARD | ELEMENT 6 | -35.026 | 6 | S-LAM2 | 35.031 | 0 |
| 13 | STANDARD | ELEMENT 7 | 43.451 | 12.7 | SF6 | 41.534 | 0 |
| 14 | STANDARD | | -85.304 | 18.8393 | | 43.142 | 0 |
| 15 | STANDARD | ELEMENT 8 | -107.003 | 12.7 | SF6 | 47.11 | 0 |
| 16 | STANDARD | ELEMENT 9 | 87.444 | 14.6298 | S-BSL7 | 53.336 | 0 |
| 17 | STANDARD | | -65.991 | 1.5 | | 55.634 | 0 |
| 18 | STANDARD | ELEMENT 10 | 151.501 | 11.7851 | S-BSM14 | 59.222 | 0 |
| 19 | STANDARD | ZOOM THICKNESS | 99.878 | 56.2066 | | 59.46 | 0 |
| STO | STANDARD | | Infinity | 1.27 | | 41.433 | 0 |
| 21 | COORDBRK | ROTATE | - | 0 | - | - | - |
| 22 | STANDARD | | Infinity | 3.6599 | | 41.734 | 0 |

FIG. 10(c)

SURFACE DATA SUMMARY (continued):

| | | | | | | |
|---|---|---|---|---|---|---|
| 23 | TOROIDAL | ELEMENT 11 | -6444.66 | 3.81 | S-BSL7 | 42.403 | 0 |
| 24 | STANDARD | | Infinity | 0 | | 42.805 | 0 |
| 25 | COORDBRK | DECENTER Y. | - | 2.5 | - | - | - |
| 26 | STANDARD | ELEMENT 12 | 98.291 | 6 | SF6 | 101.079 | 0 |
| 27 | STANDARD | ELEMENT 13 | 68.123 | 17.6893 | S-LAL8 | 94.205 | 0 |
| 28 | STANDARD | | 193.075 | 21.46865 | | 91.759 | 0 |
| 29 | COORDBRK | 45 DEG. | - | 0 | - | - | - |
| 30 | STANDARD | FILTER | Infinity | 3 | BK7 | 81.35099 | 0 |
| 31 | STANDARD | | Infinity | 0 | | 80.05754 | 0 |
| 32 | COORDBRK | -45 DEG. | - | 33.5 | - | - | - |
| 33 | COORDBRK | | - | 0 | - | - | - |
| 34 | STANDARD | FILTER | Infinity | 3 | BK7 | 60.43826 | 0 |
| 35 | STANDARD | | Infinity | 0 | | 59.00962 | 0 |
| 36 | COORDBRK | | - | 13.86 | - | - | - |
| 37 | STANDARD | ANALYZER | Infinity | 2 | BK7 | 50.32549 | 0 |
| 38 | STANDARD | | Infinity | 47.1325 | | 49.52228 | 0 |
| 39 | COORDBRK | DECENTER (8) | - | 0 | - | - | - |
| 40 | STANDARD | ELEMENT 14 | 120.934 | 5.08 | SF4 | 30 | 0 |
| 41 | STANDARD | | Infinity | 1.3805 | | 30 | 0 |
| 42 | STANDARD | COVER PLATE | Infinity | 0.7 | BK7 | 20 | 0 |
| 43 | STANDARD | ULCD | Infinity | 0.007 | | 20 | 0 |
| IMA | STANDARD | | Infinity | | | 20 | 0 |

FIG. 10(d)

SURFACE DATA DETAIL

| | | | | |
|---|---|---|---|---|
| Surface OBJ | : STANDARD | | Surface 19 | : STANDARD |
| Surface 1 | : COORDBRK | | Comment | : ZOOM THICKNESS |
| Comment | : ROTATE | | Surface STO | : STANDARD |
| Decenter X | : 0 | | Surface 21 | : COORDBRK |
| Decenter Y | : 0 | | Comment | : ROTATE |
| Tilt About X | : 3.6191 | | Decenter X | : 0 |
| Tilt About Y | : 0 | | Decenter Y | : 0 |
| Tilt About Z | : 0 | | Tilt About X | : -3.6191 |
| Order | : Decenter then tilt | | Tilt About Y | : 0 |
| Surface 2 | : STANDARD | | Tilt About Z | : 0 |
| Comment | : ELEMENT 1 | | Order | : Decenter then tilt |
| Surface 3 | : STANDARD | | Surface 22 | : STANDARD |
| Surface 4 | : STANDARD | | Surface 23 | : TOROIDAL |
| Comment | : ELEMENT 2 | | Comment | : ELEMENT 11 |
| Surface 5 | : STANDARD | | Rad of rev. | : 0 |
| Surface 6 | : STANDARD | | Coeff on y^2 | : 0 |
| Comment | : ELEMENT 3 | | Coeff on y^4 | : 0 |
| Surface 7 | : STANDARD | | Coeff on y^6 | : 0 |
| Surface 8 | : STANDARD | | Coeff on y^8 | : 0 |
| Comment | : ELEMENT 4 | | Coeff on y^10 | : 0 |
| Surface 9 | : STANDARD | | Coeff on y^12 | : 0 |
| Surface 10 | : STANDARD | | Coeff on y^14 | : 0 |
| Comment | : ELEMENT 5 | | Surface 24 | : STANDARD |
| Surface 11 | : STANDARD | | Surface 25 | : COORDBRK |
| Comment | : ZOOM THICKNESS | | Comment | : DECENTER Y. |
| Surface 12 | : STANDARD | | Decenter X | : 0 |
| Comment | : ELEMENT 6 | | Decenter Y | : -31.9731 |
| Surface 13 | : STANDARD | | Tilt About X | : 0 |
| Comment | : ELEMENT 7 | | Tilt About Y | : 0 |
| Surface 14 | : STANDARD | | Tilt About Z | : 0 |
| Surface 15 | : STANDARD | | Order | : Decenter then tilt |
| Comment | : ELEMENT 8 | | Surface 26 | : STANDARD |
| Surface 16 | : STANDARD | | Comment | : ELEMENT 12 |
| Comment | : ELEMENT 9 | | Surface 27 | : STANDARD |
| Surface 17 | : STANDARD | | Comment | : ELEMENT 13 |
| Surface 18 | : STANDARD | | | |
| Comment | : ELEMENT 10 | | | |

FIG. 10(e)

SURFACE DATA DETAIL (continued)

| | | | | | |
|---|---|---|---|---|---|
| Surface 28 | : | STANDARD | Surface 35 | : | STANDARD |
| Surface 29 | : | COORDBRK | Surface 36 | : | COORDBRK |
| Comment | : | 45 DEG. | Decenter X | : | 0 |
| Decenter X | : | 0 | Decenter Y | : | 0 |
| Decenter Y | : | 0 | Tilt About X | : | 0 |
| Tilt About X | : | 0 | Tilt About Y | : | -45 |
| Tilt About Y | : | -45 | Tilt About Z | : | 0 |
| Tilt About Z | : | 0 | Order | : | Decenter then tilt |
| Order | : | Decenter then tilt | Surface 37 | : | STANDARD |
| Surface 30 | : | STANDARD | Comment | : | ANALYZER |
| Comment | : | FILTER | Surface 38 | : | STANDARD |
| Surface 31 | : | STANDARD | Surface 39 | : | COORDBRK |
| Surface 32 | : | COORDBRK | Comment | : | DECENTER (8) |
| Comment | : | -45 DEG. | Decenter X | : | 0 |
| Decenter X | : | 0 | Decenter Y | : | 0.769 |
| Decenter Y | : | 0 | Tilt About X | : | 0 |
| Tilt About X | : | 0 | Tilt About Y | : | 0 |
| Tilt About Y | : | 45 | Tilt About Z | : | 0 |
| Tilt About Z | : | 0 | Order | : | Decenter then tilt |
| Order | : | Decenter then tilt | Surface 40 | : | STANDARD |
| Surface 33 | : | COORDBRK | Comment | : | ELEMENT 14 |
| Decenter X | : | 0 | Surface 41 | : | STANDARD |
| Decenter Y | : | 0 | Surface 42 | : | STANDARD |
| Tilt About X | : | 0 | Comment | : | COVER PLATE |
| Tilt About Y | : | 45 | Surface 43 | : | STANDARD |
| Tilt About Z | : | 0 | Comment | : | ULCD |
| Order | : | Decenter then tilt | Surface IMA | : | STANDARD |
| Surface 34 | : | STANDARD | | | |
| Comment | : | FILTER | | | |

FIG. 10(f)

INDEX OF REFRACTION DATA

| Surf | Glass | 0.550000 | | | |
|---|---|---|---|---|---|
| 0 | | 1.00000000 | 22 | | 1.00000000 |
| 1 | <CRD BRK> | 1.00000000 | 23 | S-BSL7 | 1.51805131 |
| 2 | S-BSL7 | 1.51805131 | 24 | | 1.00000000 |
| 3 | | 1.00000000 | 25 | <CRD BRK> | 1.00000000 |
| 4 | S-BAH28 | 1.72745962 | 26 | SF6 | 1.81185844 |
| 5 | | 1.00000000 | 27 | S-LAL8 | 1.71582082 |
| 6 | SF6 | 1.81185844 | 28 | | 1.00000000 |
| 7 | | 1.00000000 | 29 | <CRD BRK> | 1.00000000 |
| 8 | S-LAL8 | 1.71582082 | 30 | BK7 | 1.51852239 |
| 9 | | 1.00000000 | 31 | | 1.00000000 |
| 10 | LF5 | 1.58446289 | 32 | <CRD BRK> | 1.00000000 |
| 11 | | 1.00000000 | 33 | <CRD BRK> | 1.00000000 |
| 12 | S-LAM2 | 1.74753144 | 34 | BK7 | 1.51852239 |
| 13 | SF6 | 1.81185844 | 35 | | 1.00000000 |
| 14 | | 1.00000000 | 36 | <CRD BRK> | 1.00000000 |
| 15 | SF6 | 1.81185844 | 37 | BK7 | 1.51852239 |
| 16 | S-BSL7 | 1.51805131 | 38 | | 1.00000000 |
| 17 | | 1.00000000 | 39 | <CRD BRK> | 1.00000000 |
| 18 | S-BSM14 | 1.60523711 | 40 | SF4 | 1.76098335 |
| 19 | | 1.00000000 | 41 | | 1.00000000 |
| 20 | | 1.00000000 | 42 | BK7 | 1.51852239 |
| 21 | <CRD BRK> | 1.00000000 | 43 | | 1.00000000 |
| | | | 44 | | 1.00000000 |

FIG. 10(g)

THERMAL COEFFICIENT OF EXPANSION DATA

| Surf | Glass | TCE | | Surf | Glass | TCE |
|---|---|---|---|---|---|---|
| 0 | | 0.00000000 | | 22 | | 0.00000000 |
| 1 | <CRD BRK> | 0.00000000 | | 23 | S-BSL7 | 7.20000000 |
| 2 | S-BSL7 | 7.20000000 | | 24 | | 0.00000000 |
| 3 | | 0.00000000 | | 25 | <CRD BRK> | 0.00000000 |
| 4 | S-BAH28 | 6.60000000 | | 26 | SF6 | 8.10000000 |
| 5 | | 0.00000000 | | 27 | S-LAL8 | 6.10000000 |
| 6 | SF6 | 8.10000000 | | 28 | | 0.00000000 |
| 7 | | 0.00000000 | | 29 | <CRD BRK> | 0.00000000 |
| 8 | S-LAL8 | 6.10000000 | | 30 | BK7 | 7.10000000 |
| 9 | | 0.00000000 | | 31 | | 0.00000000 |
| 10 | LF5 | 9.10000000 | | 32 | <CRD BRK> | 0.00000000 |
| 11 | | 0.00000000 | | 33 | <CRD BRK> | 0.00000000 |
| 12 | S-LAM2 | 7.40000000 | | 34 | BK7 | 7.10000000 |
| 13 | SF6 | 8.10000000 | | 35 | | 0.00000000 |
| 14 | | 0.00000000 | | 36 | <CRD BRK> | 0.00000000 |
| 15 | SF6 | 8.10000000 | | 37 | BK7 | 7.10000000 |
| 16 | S-BSL7 | 7.20000000 | | 38 | | 0.00000000 |
| 17 | | 0.00000000 | | 39 | <CRD BRK> | 0.00000000 |
| 18 | S-BSM14 | 6.20000000 | | 40 | SF4 | 8.00000000 |
| 19 | | 0.00000000 | | 41 | | 0.00000000 |
| 20 | | 0.00000000 | | 42 | BK7 | 7.10000000 |
| 21 | <CRD BRK> | 0.00000000 | | 43 | | 0.00000000 |
| | | | | 44 | | 0.00000000 |

FIG. 10(h)

DE-CENTERED LENS GROUP FOR USE IN AN OFF-AXIS PROJECTOR

BACKGROUND OF THE INVENTION

1. Field of the Invention

This invention relates generally to projection systems, and more particularly to a novel off axis projection system including a de-centered collimating lens group.

2. Description of the Background Art

Reflective liquid crystal displays (LCDs) provide many advantages over transmissive LCDs, and, therefore, are becoming increasingly more popular for use in projection systems. For example, transmissive displays typically have a limited aperture ratio (i.e., the total area available for light to shine through a pixel) and require pixel fill to separate the pixels, resulting in a pixelated image. The limitations of transmissive displays pose formidable problems in building bright, high resolution displays at a reasonable cost. Reflective LCDs, on the other hand, include an array of highly reflective mirrors manufactured on a standard processed CMOS silicon chip back plane driver, using sub-micron metalization processes recently developed by VLSI process engineers, and do not, therefore, suffer from the limitations of the transmissive displays.

Although superior to transmissive displays in brightness and resolution, reflective displays do pose additional system design problems. For example, FIG. 1 shows a prior art, on-axis projector system 100 to include an illumination source 102, a polarizing beam splitter 104, a color separator 106, a plurality of liquid crystal displays (LCDs) 108(r, g, and b), and projection optics 110. Illumination source 102 generates a source beam of white light and directs the source beam toward polarizing beam splitter 104, which passes one portion of the source beam having a first polarity, and redirects another portion (an illumination beam) of the source beam having a second polarity along a system axis 112, toward color separator 106. Color separator 106 separates the illumination beam into its red, green, and blue components, and directs each of these colored illumination beams to a respective one of LCDs 108(r, g, and b). Each of LCDs 108(r, g, and b) is controlled by a system, e.g., a computer or other video signal source (not shown), and modulates the polarity of selective portions (i.e., pixels) of the colored illumination beams to form colored imaging beams, which are reflected back toward color separator 106. Color separator 106 recombines the colored imaging beams to form a composite imaging beam and directs the composite imaging beam back along system axis 112, toward polarizing beam splitter 104, which passes only the modulated portions of the composite imaging beam to projection optics 110. Projection optics 110 then focuses the modulated portions of the composite imaging beam onto a display surface (not shown).

System axis 112 is defined as a bisector of an angle formed between an illumination beam and an associated imaging beam. As shown in FIG. 1, beam splitting (i.e., color separation) bifurcates system axis 112. Furthermore, optical components which fold the illumination and imaging beam paths (not shown in FIG. 1) cause an associated fold in the system axis.

Because the illumination beams and the imaging beams in system 100 both travel along the same path (system axis 112), projection system 100 is considered an "on-axis" system. On-axis projection systems generally require a polarizing beam splitter such as polarizing beam splitter 104, and, therefore, suffer from the following limitations.

First, polarizing beam splitters are highly angular sensitive. Second, polarizing beam splitter 104 must perform both the polarizing function and the analyzing function, and must, therefore, work well for both orthogonal states (S & P) of polarization, thus requiring undesirable manufacturing compromises. Furthermore, polarizing beam splitter 104 introduces a significant path length through glass, which can induce undesirable aberrations in the incident and imaging beams, due to stress induced birefringence. Finally, polarizing beam splitters are very expensive, compared to, for example, polymer based polarizing films.

FIG. 2 shows an off-axis projection system 200 that does not require a polarizing beam splitter. Projection system 200 includes an illumination source 202, a condenser lens 204, a polarizer 206, a reflective LCD 208, an analyzer 210, and a projection lens group 212. Illumination source 202 generates an illumination beam 214 that is focused by condenser lens 204 to pass through polarizer 206, and impinge on LCD 208 at a non-perpendicular angle. LCD 208 modulates illumination beam 214 to form an imaging beam 216, and reflects imaging beam 216 toward projection lens group 212. A system axis 218 bisects the angle formed by illumination beam 214 and imaging beam 216. The angular separation between illumination beam 214 and imaging beam 216 allows for the separation of polarizer 206 and analyzer 210.

Projection lens group 212 focuses imaging beam 216 to project a magnified image of LCD 208 on a display surface 220. Because conventional projection lens groups also magnify the angle of illumination (i.e., the angle between illumination beam 214 and system axis 218), causing undesirable displacement of the projected image, projection lens group 212 is necessarily a custom lens group. Further, the complexity of projection lens group 212 depends on the amount of angular separation between the illumination beam and the imaging beam. In particular, for an angular separation adequate to permit a separate polarizer and analyzer (e.g., 24°), projection lens group 212 would be prohibitively expensive, requiring on the order of 35–40 separate lenses.

What is needed, therefore, is a less complex projection lens system, which allows the angular separation of the illumination beam and the imaging beam, without displacing the projected image (i.e., magnifying the angular separation).

SUMMARY

A novel projection system is described. The projection system includes a collimating lens group for collimating an imaging beam, the collimating lens group having an optical axis that is de-centered with respect to the axis of the imaging beam. Further, the optical axis of the collimating lens group forms a non-zero angle with respect to the axis of the imaging beam. In a particular embodiment, the optical axis of the collimating lens group is parallel to a system axis of the projection system. In another particular embodiment, the optical axis of the collimating lens group is de-centered with respect to the system axis.

The system further includes a display device, for modulating an illumination beam to form the imaging beam, and an optional field lens disposed between the display device and the collimating lens group. Optionally, the display device and the field lens are de-centered with respect to the system axis.

The system further includes a projection lens group having an optical axis that is de-centered with respect to the optical axis of the collimating lens group. Optionally, the optical axis of the projection lens group forms a non-zero angle with respect to the system axis and/or the optical axis of the collimating lens group.

In a particular embodiment, the collimating lens group includes a sectioned wide-field-of-view lens. Optionally, the collimating lens group further includes an aberration compensating element, for example, a weak cylinder lens.

A method of projecting a display image is also described. The method includes the step of collimating an imaging beam, by passing the imaging beam through a collimating lens group having an optical axis that is de-centered with respect to the axis of the imaging beam. In a particular method, the collimating lens group is a sectioned wide-field-of-view lens. In another particular method, the optical axis of the collimating lens group forms a non-zero angle with the axis of the imaging beam.

Another particular method further includes the step of passing the collimated imaging beam through a projection lens group. Optionally, the projection lens group has an optical axis that is de-centered with respect to and/or forms a non-zero angle with the optical axis of the collimating lens group. Optionally, the optical axis of the collimating lens group is parallel to a system axis of the projection system in which the method is performed.

Another particular method further includes the step of passing the collimated imaging beam through a projection lens group having an optical axis which forms a non-zero angle with a system axis of the projection system in which the method is performed. Another particular method further includes the step of forming an imaging beam by reflecting an illumination beam off of a display device which is de-centered with respect to a system axis of the projection system in which the method is performed. Yet another particular method further includes the step of passing the imaging beam through a field lens having an optical axis that is de-centered with respect to a system axis of the projection system in which the method is performed.

BRIEF DESCRIPTION OF THE DRAWINGS

The present invention is described with reference to the following drawings, wherein like reference numbers denote substantially similar elements:

FIGS. 10(a–h) set forth an optical prescription which details a particular embodiment of the present invention.

DETAILED DESCRIPTION

This patent application is related to the following co-pending patent applications, filed on even date herewith and assigned to a common assignee, each of which is incorporated herein by reference in its entirety:

System And Method For Reducing Peak Current And Bandwidth Requirements In A Display Driver Circuit, Ser. No. M-5016, Raymond Pinkham, W. Spencer Worley, III, Edwin Lyle Hudson, and John Gray Campbell;

System And Method For Using Forced State To Improve Gray Scale Performance Of A Display, Ser. No. M-5017, W. Spencer Worley, III and Raymond Pinkham;

System And Method For Data Planarization, Ser. No. M-5246, William Weatherford, W. Spencer Worley, III, and Wing Chow; and Internal Row Sequencer For Reducing Bandwidth And Peak Current Requirements In A Display Driver Circuit, Ser. No. M-5281, Raymond Pinkham, W. Spencer Worley, III, Edwin Lyle Hudson, and John Gray Campbell.

This patent application is also related to co-pending patent application Ser. No. M-5019, entitled Replacing Defective Circuit Elements By Column And Row Shifting In A Flat Panel Display, by Raymond Pinkham, filed Jul. 25, 1997, assigned to a common assignee, and is incorporated herein by reference in its entirety.

The present invention overcomes the problems associated with the prior art, by using a de-centered collimating lens group to collimate an off-axis imaging beam. In the following description, numerous specific details are set forth (e.g., the optical prescription for one embodiment of the invention) in order to provide a thorough understanding of the invention. Those skilled in the art will recognize, however, that the invention may be practiced apart from these specific details. In other instances, details of well known optical components have been omitted, so as not to unnecessarily obscure the present invention.

Figure 1:
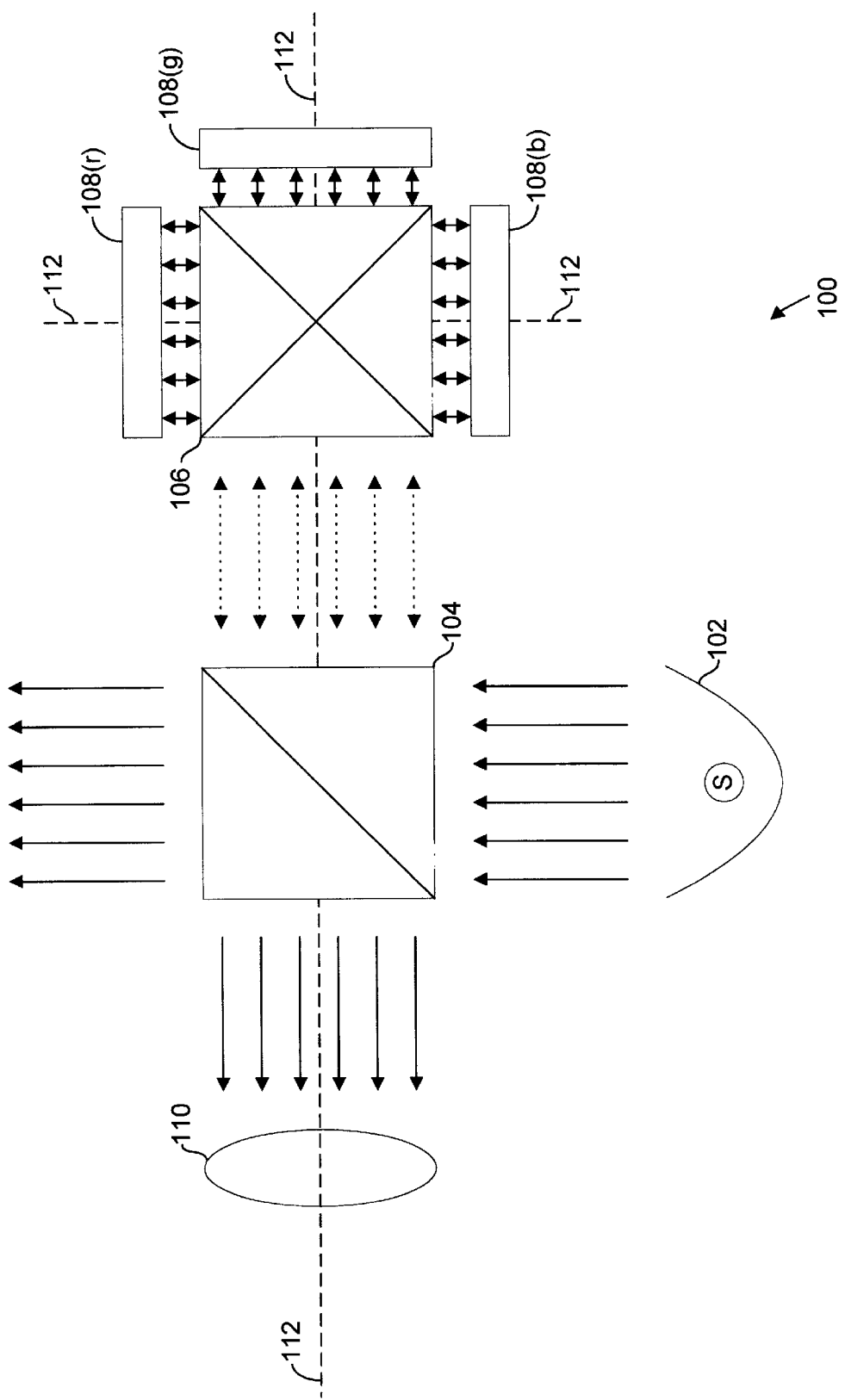
FIG. 1 is a block diagram of a prior art, on-axis projection system.
Figure 2:
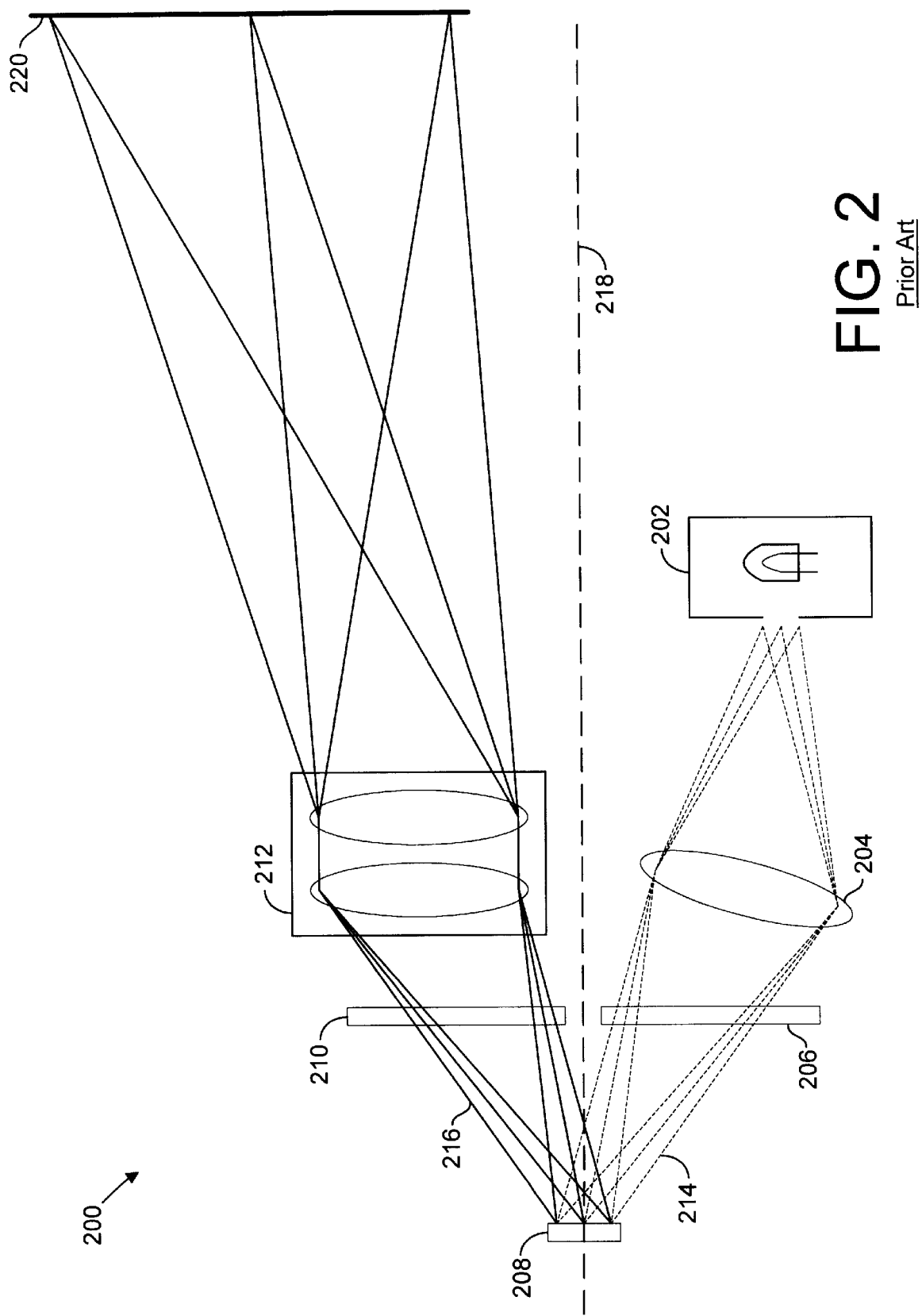
FIG. 2 is a block diagram of a prior art, off-axis projection system.
Figure 3:
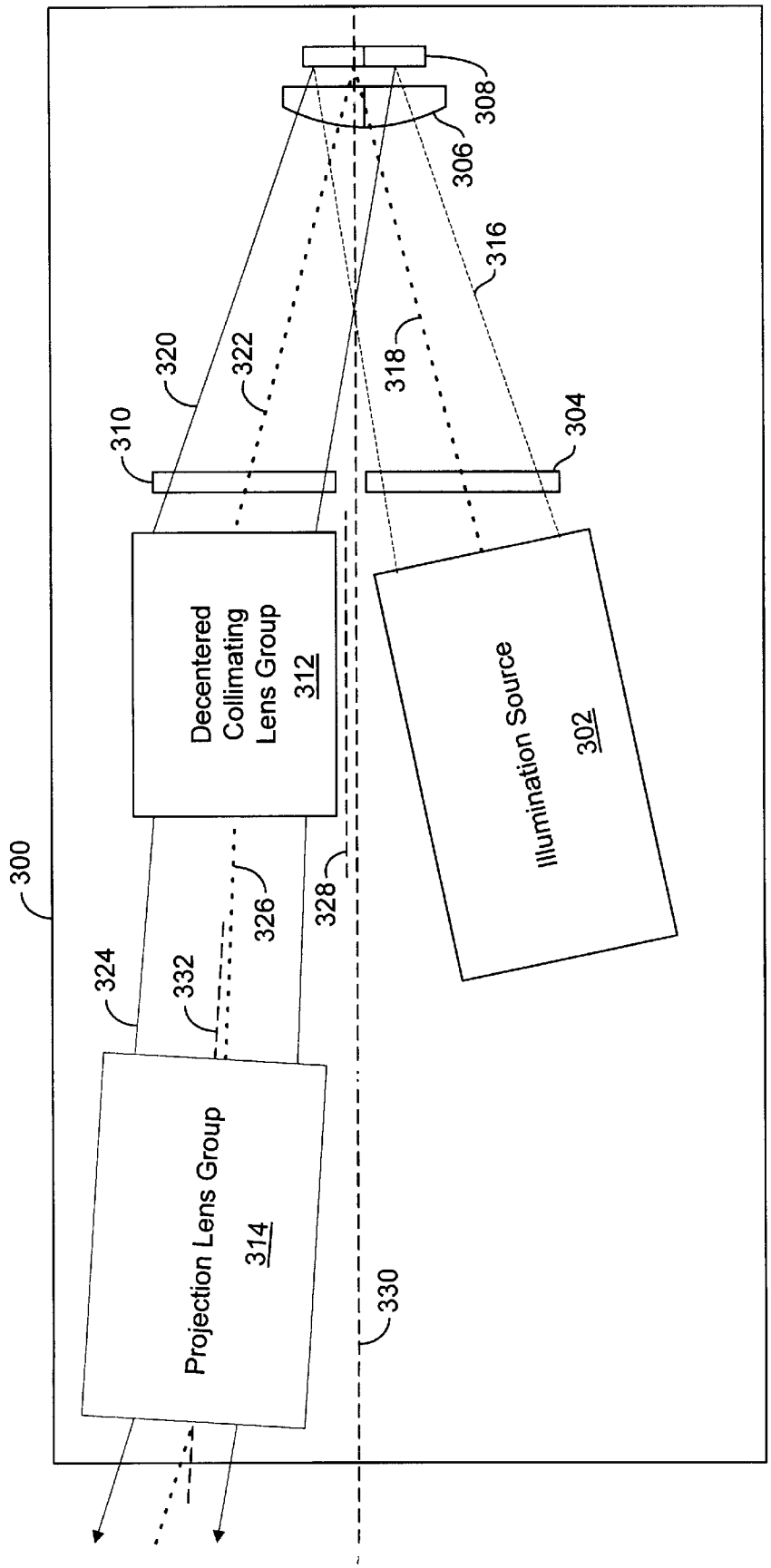
FIG. 3 is a block diagram of an off-axis projection system in accordance with the present invention.

FIG. 3 shows an off-axis projection system 300, including an illumination source 302, a polarizer 304, a field lens 306, a reflective LCD 308, an analyzer 310, a de-centered collimating lens group 312, and a projection lens group 314. Illumination source 302 generates an illumination beam 316, and directs illumination beam 316, along an axis 318, through polarizer 304 and field lens 306 to impinge on LCD 308. Polarizer 304 linearly polarizes illumination beam 316 into a first polarized state, corresponding to the transmission axis of polarizer 304. LCD 308 is controlled by a system, e.g., a computer or video signal source, (not shown), and modulates the polarity of selected portions (i.e., pixels) of illumination beam 316 to form an imaging beam 320, which is reflected along an axis 322, through analyzer 310 and into de-centered collimating lens group 312. Field lens 306 is a plane-convex lens that is centered with respect to LCD 308, and focuses the aperture stop (not shown) of illumination source 302 at a field stop (FIG. 6) near the rear of collimating lens group 312, thus avoiding the loss of much of the light of illumination beam 316.

Analyzer 310 is also a linear polarizer. Projection system 300 can operate in at least two different modes. For example, if the transmission axis of analyzer 310 is oriented parallel to the transmission axis of polarizer 304, then analyzer 310 will pass unmodulated portions and block modulated portions of imaging beam 320. On the other hand, if the transmission axis of analyzer 310 is oriented orthogonally with respect to the transmission axis of polarizer 304, then analyzer 310 will pass modulated portions and block unmodulated portions of imaging beam 320. In one embodiment, polarizer 304 and analyzer 310 are both fashioned from HN42HE polarizing material available from Polaroid Corporation.

De-centered collimating lens group 312 collimates imaging beam 320 to form a collimated imaging beam 324, and directs the collimated imaging beam along an axis 326, toward projection lens group 314. Those skilled in the art will understand that, in practical optical systems, minor adjustments are made to optimize system performance, such that collimated imaging beam 324 is not completely collimated, but rather semi-collimated. Therefore, as used herein, the term collimated is understood to be interpreted broadly, so as to also describe semi-collimated beams.

Collimating lens group 312 has an optical axis 328, which is de-centered with respect to a system axis 330, is de-centered with respect to axis 322 of imaging beam 320, and forms a non-zero angle with axis 322 of imaging beam 320. This de-centration avoids the extreme displacement of the projected image resulting from the magnification of the angle between axis 322 of imaging beam 320 and system axis 330. In other words, de-centered collimating lens group 312 allows separation of illumination beam 316 and imaging beam 320, without displacing the projected image.

Projection lens group 314 receives the collimating imaging beam 324 from de-centered collimating lens group 312, and focuses the beam to project an image onto a display surface (not shown). Projection lens group 314 has an optical axis which is de-centered with respect to optical axis 328 of collimating lens group 312, de-centered with respect to system axis 330, and tilted slightly (approx. 3.6°) with respect to system axis 330. Tilting the projection lens group 314 improves imagery over the display field, without causing an unacceptable amount of keystone distortion. Further, displacing field lens 306 and LCD 308 with respect to system axis 330, in conjunction with tilting the projection lens group 314, displaces the projected image by a desired amount above system axis 330. Those skilled in the art will understand that the degree of tilt of projection lens group 314 will necessarily vary from system to system, depending on the unique characteristics of each system, and in some cases may be completely eliminated.

Figure 4:
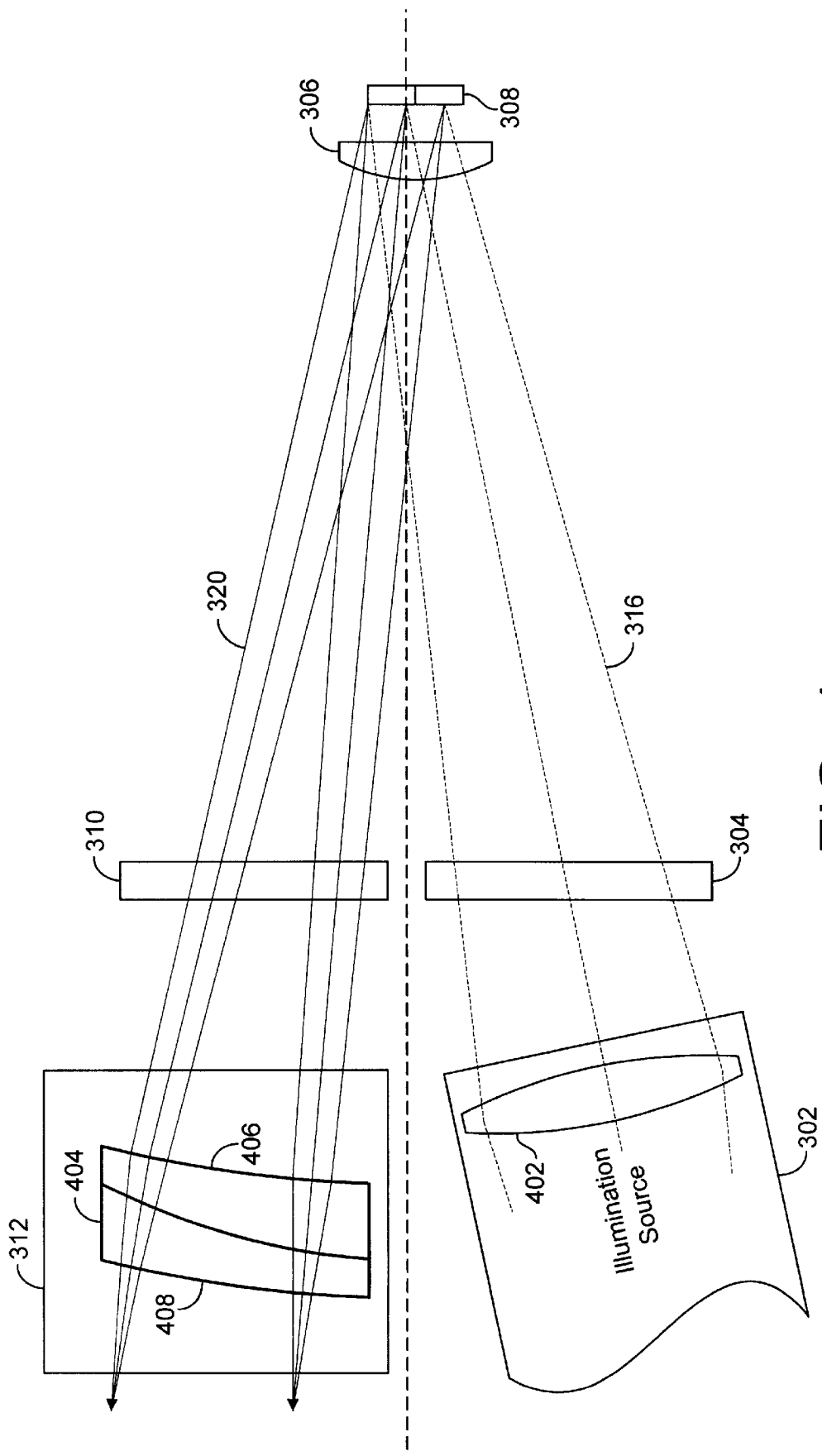
FIG. 4 is a block diagram showing a portion of the off-axis projection system of FIG. 3 in greater detail.

FIG. 4 shows a portion of projection system 300 in greater detail. Illumination source 302 includes a condenser lens 402, which focuses illumination beam 316, through polarizer 304, through field lens 306 and onto LCD 308. De-centered collimating lens group 312 includes a sectioned lens 404. Sectioned lens 404 is a doublet lens comprising a first meniscus lens 406 in contact with a second meniscus lens 408. Those skilled in the art will understand that other types of lenses (e.g., a single lens or a more complex compound lens) may be substituted for sectioned, doublet lens 404.

Figure 5:
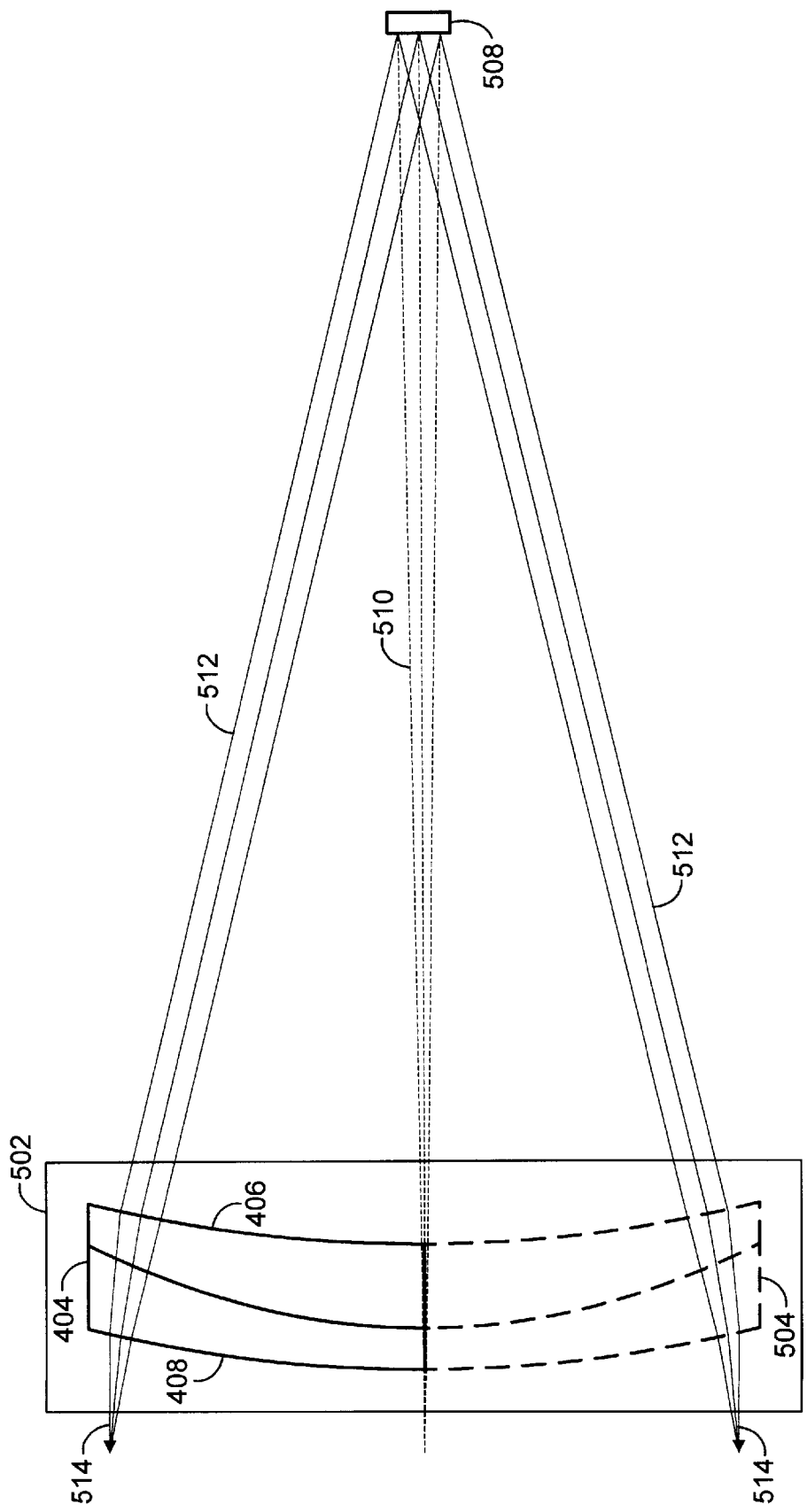
FIG. 5 is a side plan view, showing a de-centered collimating lens of FIG. 4 as a section of a wide-field-of-view lens.

FIG. 5 shows an on-axis projection system 500, including sectioned lens 404 as a portion of a wide field of view lens 502, to illustrate the concept of using a de-centered collimating lens in a projection system. The remaining portion 504 of lens 502 is shown by dashed lines. Projection system 500 further includes a reflective LCD 508, which modulates selected portions of an illumination beam 510, to form an imaging beam 512, as it is reflected off of LCD 508.

LCD 508 is disposed near the focal point of lens 502, such that the imaging beam 512 is collimated by lens 502, to form a collimated imaging beam 514, carrying an image of LCD 508. Because an image of LCD 508 can be generated from only a portion (e.g., the upper half) of collimated imaging beam 514, the lower portion 504 of lens 502 is not essential, and can, therefore, be eliminated to allow off axis illumination of LCD 508. Furthermore, the collimation of imaging beam 512 allows for the use of a more conventional projection lens group.

Figure 6A:
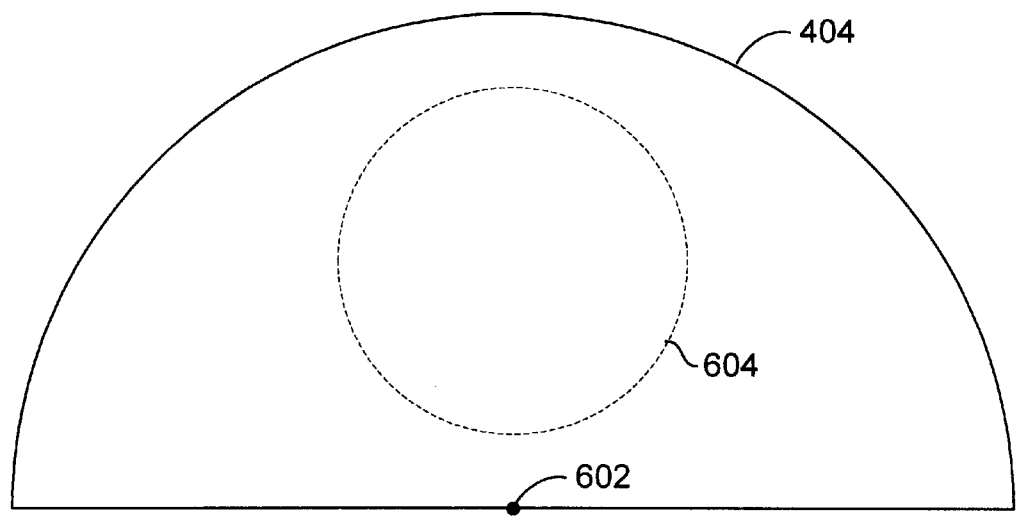
FIG. 6 is an axial plan view of the de-centered collimating lens of FIG. 4.
Figure 6B:
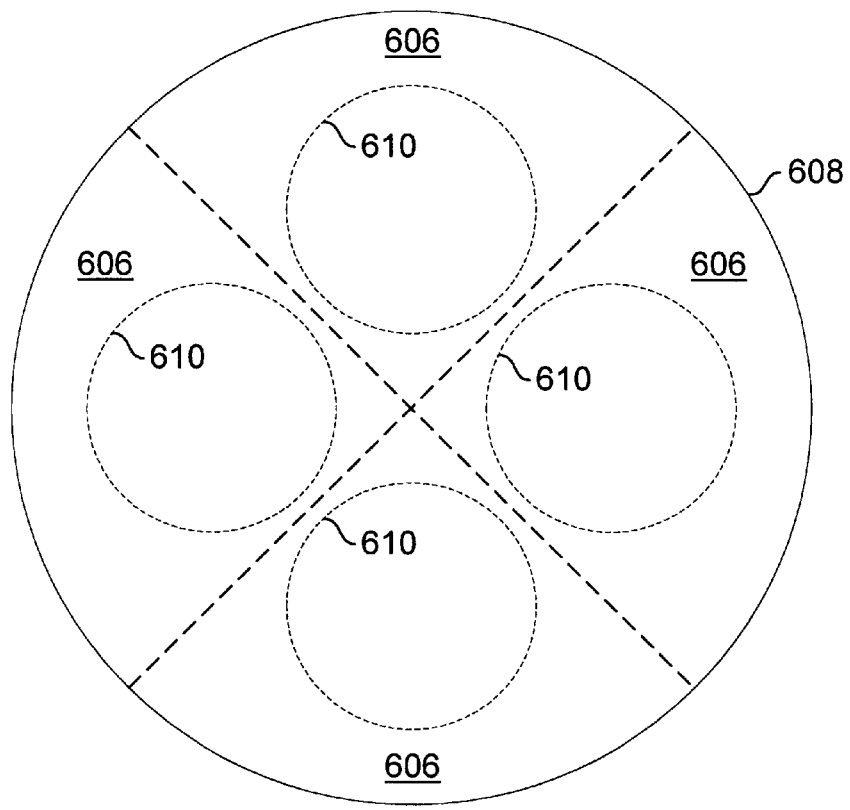

FIG. 6A is a plan view of sectioned lens 404, along its optical axis 602, with imaging beam 320 focused at the field stop 604. Note that field stop 604 occupies only a small portion of the surface area of sectioned lens 404. Thus, as shown in FIG. 6B, several sectioned lenses 606 may be cut from one conventional circular lens 608, the number of sections 606 depending on the relative sizes of the circular lens 608 and the desired field stops 610.

Figure 7:
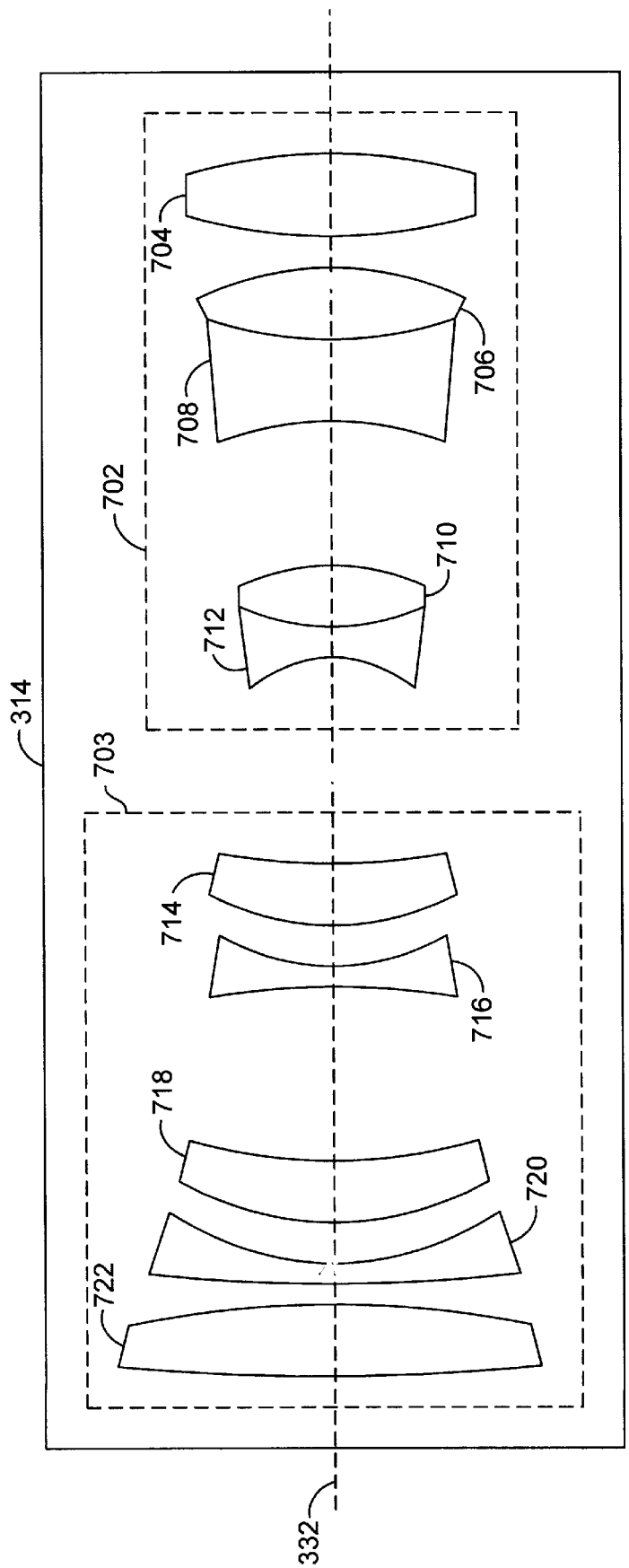
FIG. 7 is a cross sectional view, taken through the optical axis, of a projection lens group shown in FIG. 3.

FIG. 7 shows projection lens group 314 in greater detail to include a zoom group 702 and a focus group 703, both disposed on optical axis 332 of projection lens group 314. Zoom group 702 includes a first bi-convex lens 704, a second bi-convex lens 706 in contact with a first bi-concave lens 708, and a third bi-convex lens 710 in contact with a second bi-concave lens 712, all aligned along optical axis 332. Zoom group 702 is moveable with respect to focus group 703, along optical axis 332, to adjust the magnification of the projected image. Focus group 703 includes a first meniscus lens 714, a bi-concave lens 716, a second meniscus lens 718, a third meniscus lens 720, and a bi-convex lens 722, all aligned along optical axis 322. Second meniscus lens 718 is moveable with respect to the remaining lenses of focus group 703, along optical axis 332, to focus the projected image.

Figure 8:
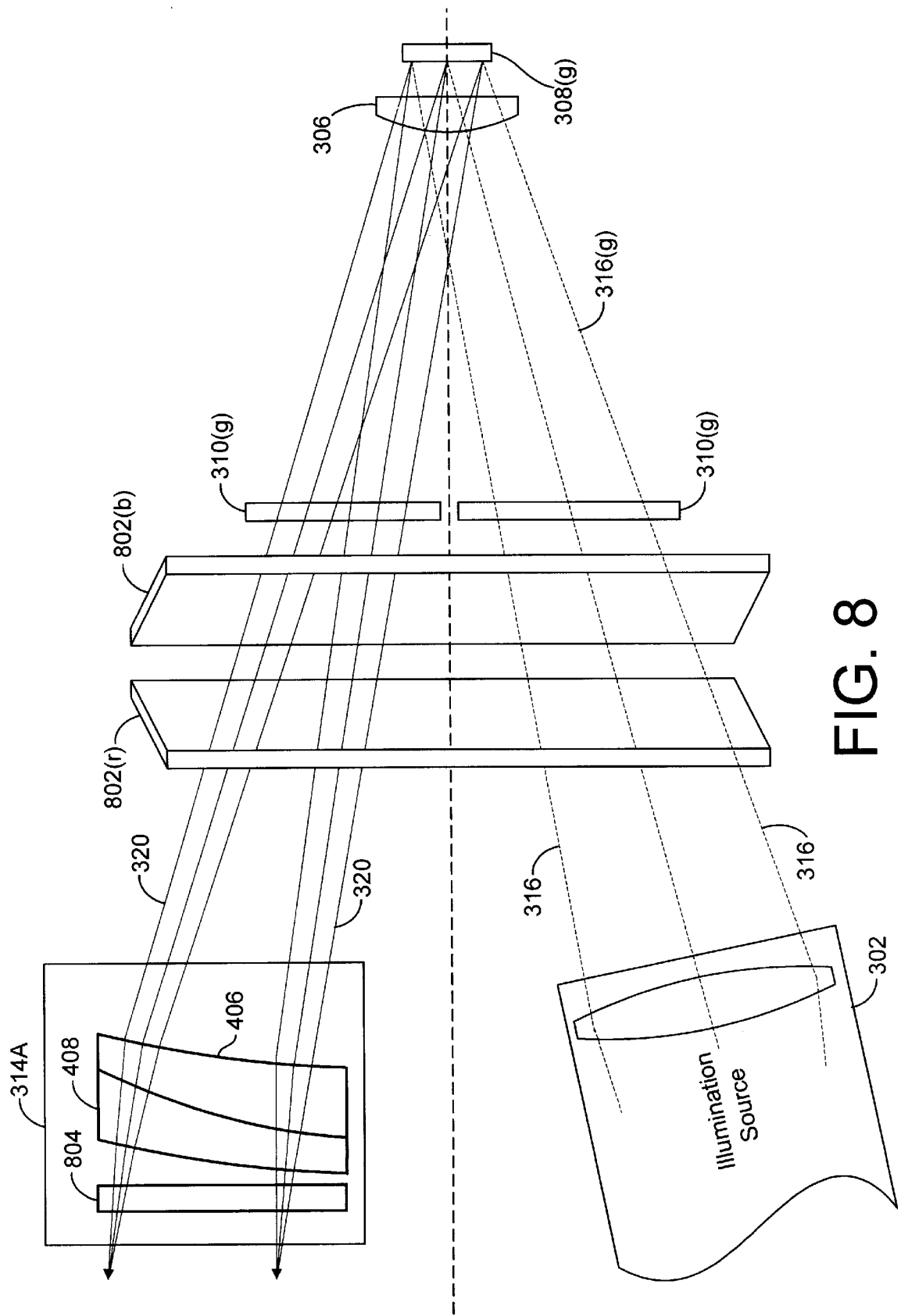
FIG. 8 is a perspective view showing one channel of a multi-color projection system in accordance with the present invention.

FIG. 8 is a perspective view, showing one channel of a multi-color projection system 800 in accordance with the present invention. Projection system 800 is similar to projection system 300, except that two dichroic plates 802(*r*) and 802(*b*) are disposed in illumination beam 316 and imaging beam 320, to separate illumination beam 316 into red 316(*r*) (FIG. 9), blue 316(*b*) (FIG. 9), and green 316(*g*) colored illumination beams, and to direct each colored illumination beam 316(*r, b,* and *g*) to a respective one of three LCDs 308(r) (FIG. 9), 308(*b*) (FIG. 9), and 308(*g*). LCDs 308(*r, b,* and *g*) modulate the colored illumination beams 316(*r, b,* and *g*) to form colored imaging beams 320(*r, b,* and *g*), respectively, and reflect the colored imaging beams 320(*r, b,* and *g*) back toward dichroic plates 802(*r* and *b*) which recombine the colored imaging beams 320(*r, b,* and *g*) to form imaging beam 320. Dichroic plates 802(*r*) and 802(*b*) are both approximately 3 mm thick, and form angles of 45° and 135°, respectively, with respect to both illumination beam 316 and imaging beam 320. The angular separation between illumination beam 316 and imaging beam 320, in conjunction with the color separation by dichroic plates 802(*r* and *b*), allows separate polarizers 304(*r, b,* and *g*) and separate analyzers 310(*r, b,* and *g*) to be used for each color channel, advantageously decoupling the polarization and color separation processes.

Projection system 800 further differs from projection system 300 in that de-centered collimating lens group 314 is replaced with de-centered collimating lens group 314A. De-centered collimating lens group 314A is similar to de-centered collimating lens group 314, except for the addition of an aberration compensating element, weak cylinder lens 804, which corrects for astigmatism induced across the projected image by dichroic plates 802(*r* and *b*).

Figure 9:
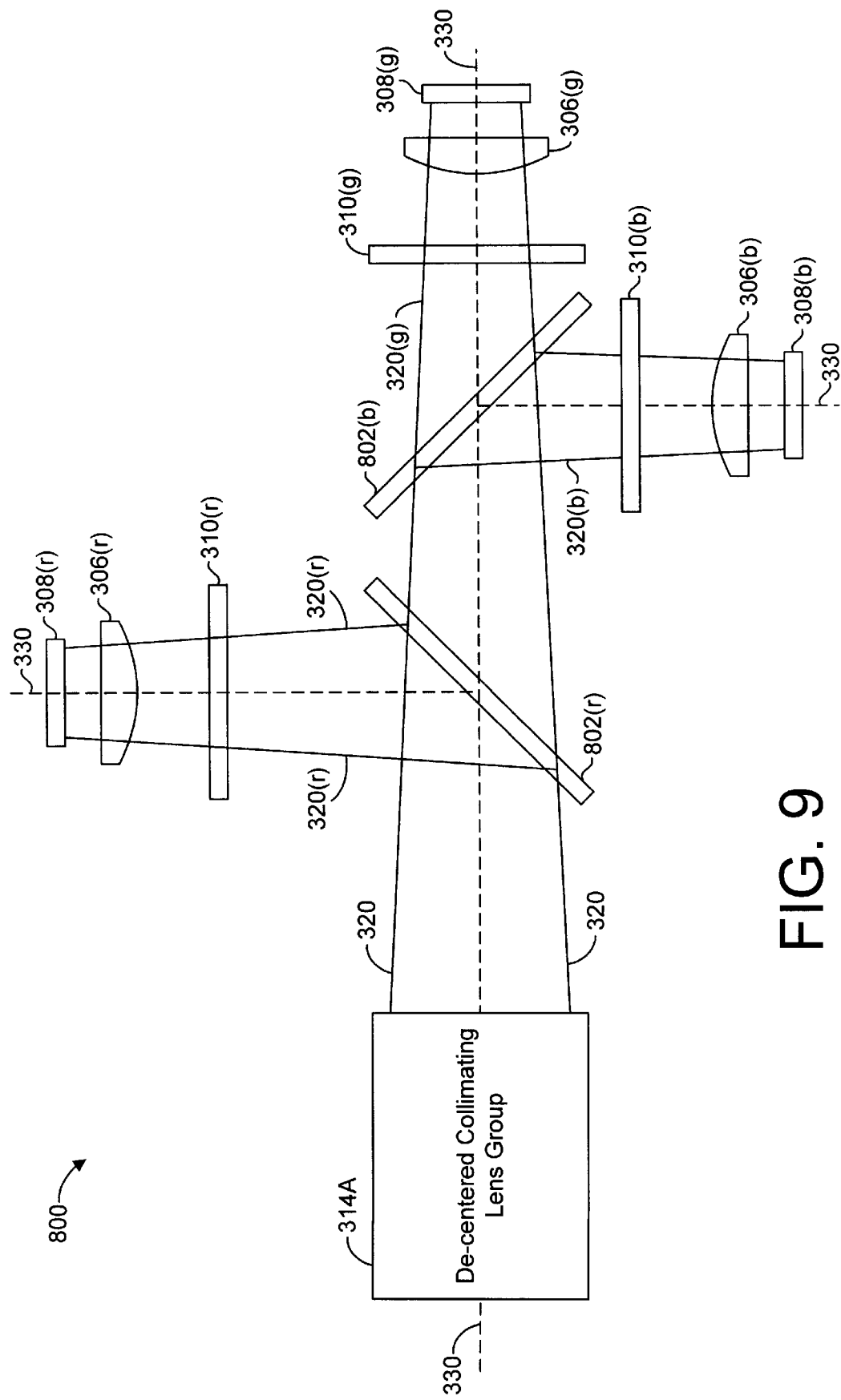
FIG. 9 is a block diagram showing a top view of the projection system of FIG. 8.

FIG. 9 shows a top view of projection system 800, including the remaining color channels of the system. System axis 330 lies in the plane of the page, while imaging beam 320 extends out of the page, and obscures the view of illumination beam 316, which rises from illumination source 302 located beneath the plane of the page. De-centered collimating lens group 314A is disposed above the plane of the page, and obscures the view of illumination source 302.

Similarly, analyzers 310(*r, b* and *g*) obscure the view of polarizers 304(*r, b,* and *g*), respectively.

FIGS. 10(*a–h*) provide an optical prescription, which details a particular embodiment of the present invention. In the optical prescription, the listed elements correspond to the lenses of projection systems 300 and 800, as follows:

Element 1 corresponds to bi-convex lens 722, FIG. 7;

Element 2 corresponds to third meniscus lens 720, FIG. 7;

Element 3 corresponds to second meniscus lens 718, FIG. 7;

Element 4 corresponds to bi-concave lens 716, FIG. 7;

Element 5 corresponds to first meniscus lens 714 (FIG. 7);

Element 6 corresponds to second bi-concave lens 712 (FIG. 7);

Element 7 corresponds to third bi-convex lens 710 (FIG. 7);

Element 8 corresponds to first bi-concave lens 708 (FIG. 7);

Element 9 corresponds to second bi-convex lens 706 (FIG. 7);

Element 10 corresponds to first bi-convex lens 704 (FIG. 7);

Element 11 corresponds to weak cylinder lens 804 (FIG. 8);

Element 12 corresponds to second meniscus lens 408 (FIGS. 4, 5, 6A, and 8);

Element 13 corresponds to first meniscus lens 406 (FIGS. 4, 5, 6A, and 8); and Element 14 corresponds to field lenses 306 and 306(*r, b,* and *g*) (FIGS. 3, 4, 8, and 9).

Those skilled in the art will recognize that the invention may be practiced apart from the specific optical prescription provided.

The description of particular embodiments of the present invention is now complete. Many of the described features may be substituted, altered or omitted without departing from the scope of the invention. For example, alternate displays such as deformable mirror devices, may be substituted for the reflective LCDs.

We claim:

1. A projection system comprising:
   a display device disposed to receive an illumination beam along a first optical path for modulating the illumination beam to form an imaging beam, and reflecting the imaging beam along a second optical path; and
   a collimating lens group disposed in said second optical path and being de-centered with respect to said second optical path, for collimating said imaging beam.

2. A projection system according to claim 1, wherein said collimating lens group has an optical axis that forms a non-zero angle with respect to said second optical path.

3. A projection system according to claim 2 having a system axis, wherein said optical axis of said collimating lens group is parallel to said system axis.

4. A projection system according to claim 2 having a system axis, wherein said collimating lens group is de-centered with respect to said system axis.

5. A projection system according to claim 2 having a system axis, wherein said display device is de-centered with respect to said system axis.

6. A projection system according to claim 2 having a system axis, further comprising a field lens disposed between said display device and said collimating lens group, said field lens being de-centered with respect to said system axis.

7. A projection system according to claim 2, further comprising a projection lens group disposed to receive said collimated beam, said projection lens group having an optical axis and being de-centered with respect to said optical axis of said collimating lens group.

8. A projection system according to claim 7, wherein said optical axis of said projection lens group forms a non-zero angle with respect to said optical axis of said collimating lens group.

9. A projection system according to claim 8 having a system axis, wherein said collimating lens group is de-centered with respect to said system axis.

10. A projection system according to claim 9, wherein said display device is de-centered with respect to said system axis.

11. A projection system according to claim 10, further comprising a field lens disposed between said display device and said collimating lens group, said field lens being de-centered with respect to said system axis.

12. A projection system according to claim 1, wherein said collimating lens group comprises a sectioned wide-field-of-view lens.

13. A projection system according to claim 12, wherein said collimating lens group further comprises an aberration compensating element to correct aberrations induced in said imaging beam by said projection system.

14. A projection system comprising:
   an illumination source for emitting an illumination beam along a first optical path;
   a display device disposed in said first optical path for modulating the illumination beam to form an imaging beam, and reflecting the imaging beam along a second optical path; and
   a collimating lens group disposed in said second optical path and having an optical axis that forms a non-zero angle with said second optical path, for collimating said imaging beam.

15. A projection system according to claim 14, wherein said collimating lens group is de-centered with respect to said second optical path.

16. A projection system according to claim 15, wherein said optical axis of said collimating lens group is parallel to a bisector of an angle formed between said first optical path and said second optical path.

17. A projection system according to claim 15, wherein said collimating lens group is de-centered with respect to a bisector of an angle formed between said first optical path and said second optical path.

18. A projection system according to claim 15, wherein said display device is de-centered with respect to a bisector of an angle formed between said first optical path and said second optical path.

19. A projection system according to claim 15, further comprising a field lens disposed adjacent said display device in said first optical path and said second optical path, said field lens being de-centered with respect to a bisector of an angle formed between said first optical path and said second optical path.

20. A projection system according to claim 15, further comprising a projection lens group disposed to receive said collimated imaging beam, said projection lens group having an optical axis and being de-centered with respect to said optical axis of said collimating lens group.

21. A projection system according to claim 20, wherein said optical axis of said projection lens group forms a non-zero angle with the optical axis of said collimating lens group.

22. A projection system according to claim 21, wherein said optical axis of said collimating lens group is parallel to a bisector of an angle formed between said first optical path and said second optical path.

23. A projection system according to claim 22, wherein said display device is de-centered with respect to said bisector.

24. A projection system according to claim 23, further comprising a field lens disposed adjacent said display device in said first optical path and said second optical path, said field lens being de-centered with respect to said bisector.

25. A method of projecting a display image, said method comprising:

modulating an illumination beam received along a first optical path with a reflective display device to form an imaging beam;

reflecting said imaging beam along a second optical path; and collimating said imaging beam with a collimating lens group having an optical axis that forms a non-zero angle with respect to said second optical path.

26. A method of projecting a display image in accordance with claim 25, wherein said collimating lens group comprises a sectioned wide-field-of-view lens.

27. A method of projecting a display image in accordance with claim 25, wherein said collimating lens group is de-centered with respect to said second optical path.

28. A method of projecting a display image in accordance with claim 27, further comprising the step of projecting said display image by passing said collimated imaging beam through a projection lens group having an optical axis and being de-centered with respect to said optical axis of said collimating lens group.

29. A method of projecting a display image in accordance with claim 27, further comprising the step of projecting said display image by passing said collimated imaging beam through a projection lens group having an optical axis forming a non-zero angle with said optical axis of said collimating lens group.

30. In a projection system having a system axis, a method of projecting a display image in accordance with claim 27, wherein said optical axis of said collimating lens group is parallel to said system axis.

31. In a projection system having a system axis, a method of projecting a display image in accordance with claim 27, further comprising the step of projecting said display image by passing said collimated imaging beam through a projection lens group having an optical axis which forms a non-zero angle with said system axis.

32. In a projection system having a system axis, a method of projecting a display image in accordance with claim 27, wherein said display device is de-centered with respect to said system axis.

33. In a projection system having a system axis, a method of projecting a display image in accordance with claim 27, further comprising the step of passing said imaging beam through a field lens de-centered with respect to said system axis.

34. A method of projecting a display image in accordance with claim 27, wherein said collimating lens group comprises a sectioned wide-field-of-view lens.

35. A projection system comprising:

an illumination source for emitting an illumination beam along a first optical path;

a display device disposed in said first optical path for modulating the illumination beam to form an imaging beam, and reflecting the imaging beam along a second optical path forming a non-zero angle with said first optical path;

a collimating lens group disposed in said second optical path and having an optical axis that forms a non-zero angle with said second optical path, for collimating said imaging beam along a third optical path, said third optical path forming a non-zero angle with said second optical path; and a projection lens group having an optical axis centered with respect to said third optical path.

36. A projection system according to claim 35, further comprising:

a polarizer disposed in said first optical path between said illumination source and said display device, to polarize said illumination beam; and an analyzer disposed in said second optical path between said display device and said collimating lens group, to analyze said imaging beam.

37. A projection system according to claim 36, further comprising:

a color separator disposed between said polarizer and said illumination source to separate said illumination beam into a plurality of colored illumination beams;

a plurality of display devices, each associated with a respective one of said colored illumination beams, for modulating the associated colored illumination beam to form associated colored imaging beams; and a color combiner for combining the colored imaging beams to form said imaging beam.

38. A projection system according claim 37, further comprising:

a plurality of polarizers, each associated with one of said plurality of display devices and being disposed between said associated display device and said color separation means; and a plurality of analyzers, each associated with one of said plurality of display devices and being disposed between said associated display device and said color combining means.

* * * * *

UNITED STATES PATENT AND TRADEMARK OFFICE
CERTIFICATE OF CORRECTION

PATENT NO. : 6,076,931
DATED : June, 20, 2000
INVENTOR(S) : Bone, et al.

Page 1 of 1

It is certified that error appears in the above-identified patent and that said Letters Patent is hereby corrected as shown below:

Column 4,
Line 5, the portion reading "Ser. No. M-5016," should read -- Ser. No. 08/970,665, --.
Lines 9-10, the portion reading "Ser. No. M-5017," should read -- Ser. No. 08/970/878, --.
Lines 12-13, the portion reading "Ser. No. M-5246," should read -- Ser. No. 08/970,307,--.
Line 17, the portion reading "Ser. No. M-5281," should read -- Ser. No. 08/970, 443, --.
Line 21, the portion reading "Ser. No. M-5019," should read -- Ser. No. 08/901,059,--.

Column 8,
Line 3, the portion reading "collimated beam," should read -- collimated imaging beam, --.

Signed and Sealed this

Twenty-third Day of October, 2001

Attest:

*Nicholas P. Godici*

NICHOLAS P. GODICI
*Attesting Officer*  *Acting Director of the United States Patent and Trademark Office*